United States Patent [19]
Uta et al.

[11] Patent Number: 6,141,337
[45] Date of Patent: Oct. 31, 2000

[54] SPREAD SPECTRUM COMMUNICATION SYSTEM

[75] Inventors: Takaki Uta, Yokohama; Takashi Yano, Tokorozawa; Nobukazu Doi, Hachioji, all of Japan

[73] Assignee: Hitachi, Ltd., Tokyo, Japan

[21] Appl. No.: 08/917,733

[22] Filed: Aug. 27, 1997

[30] Foreign Application Priority Data

Nov. 7, 1996 [JP] Japan .................................. 8-294826

[51] Int. Cl.$^7$ .................................................... H04J 3/06
[52] U.S. Cl. .......................................... 370/350; 370/335
[58] Field of Search ................................... 370/320, 335, 370/342, 432, 441, 479, 350, 491, 500, 509, 516, 517, 508, 503, 510, 512, 513, 515, 519, 332; 375/200, 205, 206, 356, 371, 207

[56] References Cited

U.S. PATENT DOCUMENTS

| | | | |
|---|---|---|---|
| 4,905,221 | 2/1990 | Ichiyoshi | 370/320 |
| 5,111,479 | 5/1992 | Akazawa | 375/200 |
| 5,400,359 | 3/1995 | Hikoso et al. | 375/202 |
| 5,495,498 | 2/1996 | Tominaga | 375/200 |
| 5,638,362 | 6/1997 | Dohi et al. | 370/350 |
| 5,673,260 | 9/1997 | Umeda et al. | 370/342 |
| 5,689,525 | 11/1997 | Takeishi et al. | 375/141 |
| 5,703,873 | 12/1997 | Ojanpera et al. | 370/335 |
| 5,703,902 | 12/1997 | Ziv et al. | 370/332 |
| 5,712,871 | 1/1998 | Chang | 375/206 |
| 5,715,244 | 2/1998 | Park et al. | 370/515 |
| 5,724,378 | 3/1998 | Miki et al. | 375/200 |
| 5,748,687 | 5/1998 | Ozluturk | 370/342 |
| 5,790,588 | 8/1998 | Fukawa et al. | 370/342 |
| 5,799,010 | 8/1998 | Lomp et al. | 370/335 |
| 5,802,046 | 9/1998 | Scott | 370/508 |
| 5,835,489 | 11/1998 | Moriya et al. | 370/342 |
| 5,859,612 | 1/1999 | Gilhousen | 342/457 |
| 5,872,810 | 2/1999 | Philips et al. | 375/222 |
| 5,878,076 | 3/1999 | Siedenburg | 375/141 |
| 5,943,329 | 8/1999 | Ohgoshi et al. | 370/335 |
| 5,943,361 | 8/1999 | Gilhousen et al. | 375/142 |
| 5,974,082 | 10/1999 | Ishikawa et al. | 375/141 |
| 6,034,635 | 3/2000 | Gilhousen | 342/457 |

OTHER PUBLICATIONS

"A Demodulation for Direct–Sequence Spread ALOHA System", Technical Report of the Institute of Electronics Information and Communication Engineers A ·P95–10 (1995–04), pp. 67–74.

U.S. Ser. No. 08/690,819 filed on Aug. 1, 1996.

*Primary Examiner*—Dang Ton
*Assistant Examiner*—Phirin Sam
*Attorney, Agent, or Firm*—Antonelli, Terry, Stout & Kraus, LLP

[57] ABSTRACT

Before transmitting an upward traffic packet of a long code, a mobile terminal sends a short packet including a short code to a reservation channel. A base station measures delay of each packet by an initial acquisition circuit to establish chip synchronization timing and a packet de-multiplexer to separate from each other packets overlapped in time with each other. When spreading the long-code packet transmitted via a traffic channel from the mobile terminal, information of the measured delay time is synchronously despread by setting a coefficient at an appropriate point of timing to a matched filter.

6 Claims, 17 Drawing Sheets

SPREAD SPECTRUM COMMUNICATION SYSTEM

BACKGROUND OF THE INVENTION

1. Field of the Invention

The present invention relates to a mobile communication system and a mobile terminal, and in particular, to a synchronizing method for synchronizing a spreading code in a reverse or upward communication line to be applied to a reservation code division multiple access (CDMA) packet communication system.

2. Description of the Related Art

A high-speed synchronizing method in a reverse line of a CDMA packet communication system has been described in pages 67 to 74 of an article entitled "A Demodulation for Direct-Sequence Spread ALOHA System", Technical Report of the Institute of Electronics, Information and Communication Engineers (IEICE), A P95-10 (1995-04).

FIG. 17 shows a conventional tranceiver section in a block diagram. In a mobile terminal, transmission data is multiplied by a spreading code generated from a PN generator 80. The obtained data is transmitted via a high-frequency circuit 404 from an antenna 400a. The spreading code generated from the PN generator 80 is equal to one symbol and such a code will be called "short code" herebelow. A receiver section of a base station receives a signal from the mobile terminal. The signal received by an antenna 400b is delivered via a high-frequency circuit 403 to be subjected to a correlation process in a matched filter 601. To extract received data from a signal outputted from the matched filter, an initial acquisition circuit 603 detects a preamble 202 of a packet, which will be described later, and then produces a synchronizing signal. Using the synchronizing signal produced from the initial acquisition circuit 603 as a reference signal, a packet de-multiplexer 605 samples the signal from the filter 601 at a symbol period or for each symbol to produce an associated value. The signal outputted from the de-multiplexer 605 is demodulated by a detector circuit 607.

FIG. 2 shows a format of packets communicated in the conventional example. The packet includes, as shown in (A) of FIG. 2, a preamble 202a of which each bit is "1", a frame start delimiter 203a to separate the preamble from data, and information data 204a in this order. As can be seen from (B) and (C), a short code equivalent to the symbol period is employed as the spreading code.

As described above, in the CDMA packet communication system proposed according to the prior art, a short code is adopted as the spreading code because of restriction of time required for acquisition. However, when the short code is used in the CDMA communication system, interference occurs between the spreading codes and hence the number of communicable terminals is decreased. Although it is desired to employ a long code (having a period of several symbols), there arises a problem that the long code requires a longer period of time for acquisition. To reduce the time required for acquisition, it is necessary to utilize a matched filter conducting a larger number of operations, which is not practical because of limitation of the circuit size.

Reference may further be made to U.S. patent application Ser. No. 08/690,819 filed on Aug. 1, 1996 and entitled "CDMA MOBILE COMMUNICATION SYSTEM & COMMUNICATION METHOD".

SUMMARY OF THE INVENTION

It is therefore an object of the present invention to provide a CDMA communication system having a large capacity of subscribers capable of fast or high-speed acquisition of the long code in an upward or reverse link without increasing the hardware size thereof.

In a CDMA communication system according to the present invention, the radio channel between a base station and a mobile terminal includes a plurality of traffic channels to transmit an upward or reverse link data packet (from the mobile terminal to the base station) and a downward or forward link data packet (from the base station to the mobile terminal), a reservation channel to transmit a reservation packet indicating a request for allocation of a traffic channel from the mobile terminal to the base station, and a reply channel to transmit a reply packet indicating a traffic channel for data communication from the base station to the mobile terminal. The CDMA spread spectrum is applied to each of the reservation, reply, and traffic channels.

A mobile terminal having a request for data transmission sends a reservation packet at timing synchronized with reference timing on the reservation channel. To specify a transfer channel and transfer timing to be used by each mobile station, the base station transmits a reply packet via the reply channel. Each mobile terminal communicates a data packet at the specified timing via the traffic channel specified by the reply packet.

Additionally, a pilot channel is disposed in the downward direction (from the base station to mobile terminals) to transmit via the pilot channel a pilot signal of which each bit is fixed to "0" or "1". Each mobile terminal continuously keeps synchronization with the pilot signal. Since data packets on each of the downward reply and traffic channels are transmitted in synchronism with the pilot signal, the mobile terminal can despread signals on each of the reply and downward traffic channels in accordance with the timing of pilot signal kept synchronized with the mobile terminal.

In a favorable mode of embodying the present invention, each of the reply, traffic, and pilot channels is assigned with a unique long code (a pseudo noise (PN) is assigned as the spreading code) and the reservation channel is assigned with a short code.

The mobile terminal establishes transmission reference timing for the reservation and upward traffic channels according to the pilot signal. The point of timing of arrival at the base station of the reservation and upward traffic packets sent from the mobile terminal in synchronism with the reference timing is delayed relative to the reference timing of the base station for a period of propagation delay due to the distance of upward and downward packet propagation between the mobile terminal and the base station. The base station despreads by a matched filter (MF), which changes a coefficient with the symbol period, the signals spread according to the long code. Consequently, when the timing difference exceeds the one-symbol time between the reception timing of the upward traffic packet and that of the base station due to the propagation delay, the despreading process cannot be normally accomplished, namely, the signals cannot be demodulated.

To solve the problem, a short code is allocated to the reservation channel because it is unnecessary to alter the matched filter coefficient. The base station identifies by the matched filter the signals of a plurality of reservation packets sent from the plural mobile terminals, the packets being overlapped with each other with respect to time. The base station then conducts bit signal processing for each packet and measures the propagation delay time thereof. Using the measured delay time, the reception timing of the upward traffic packet is adjusted with the one-symbol precision to thereby accomplish the despreading process at a high speed for the upward traffic channel to which the long code is allocated.

According to a first embodiment of the present invention, the propagation delay time measured on the reservation channel is used to predict the packet propagation delay time for the upward traffic channel so as to achieve the high-speed acquisition by the matched filter for traffic channel which changes the coefficient for each symbol or with the symbol period.

According to a second embodiment of the present invention, the propagation delay time measured on the reservation channel is notified via the reply channel to the pertinent mobile terminal. According to the propagation delay time, the mobile terminal then corrects the transmission timing of the upward traffic packet to achieve the high-speed acquisition by a matched filter for traffic channel, the filter changing the coefficient with the symbol period.

Furthermore, according to the first and second embodiments of the present invention, the traffic channel receiver of the base station includes a packet de-multiplexer and a mixer. In the configuration, signals which are sent via a multiple channel and which are overlapped in time with each other are detected and are mixed with each other to thereby carry out a RAKE reception. This resultantly improves the probability of acquisition and the signal-to-noise ratio.

BRIEF DESCRIPTION OF THE DRAWINGS

These and other objects, features and advantages of the present invention will become more apparent in view of the following detailed description of the preferred embodiments in conjunction with accompanying drawings in which.

DESCRIPTION OF THE PREFERRED EMBODIMENTS

Figure 1:
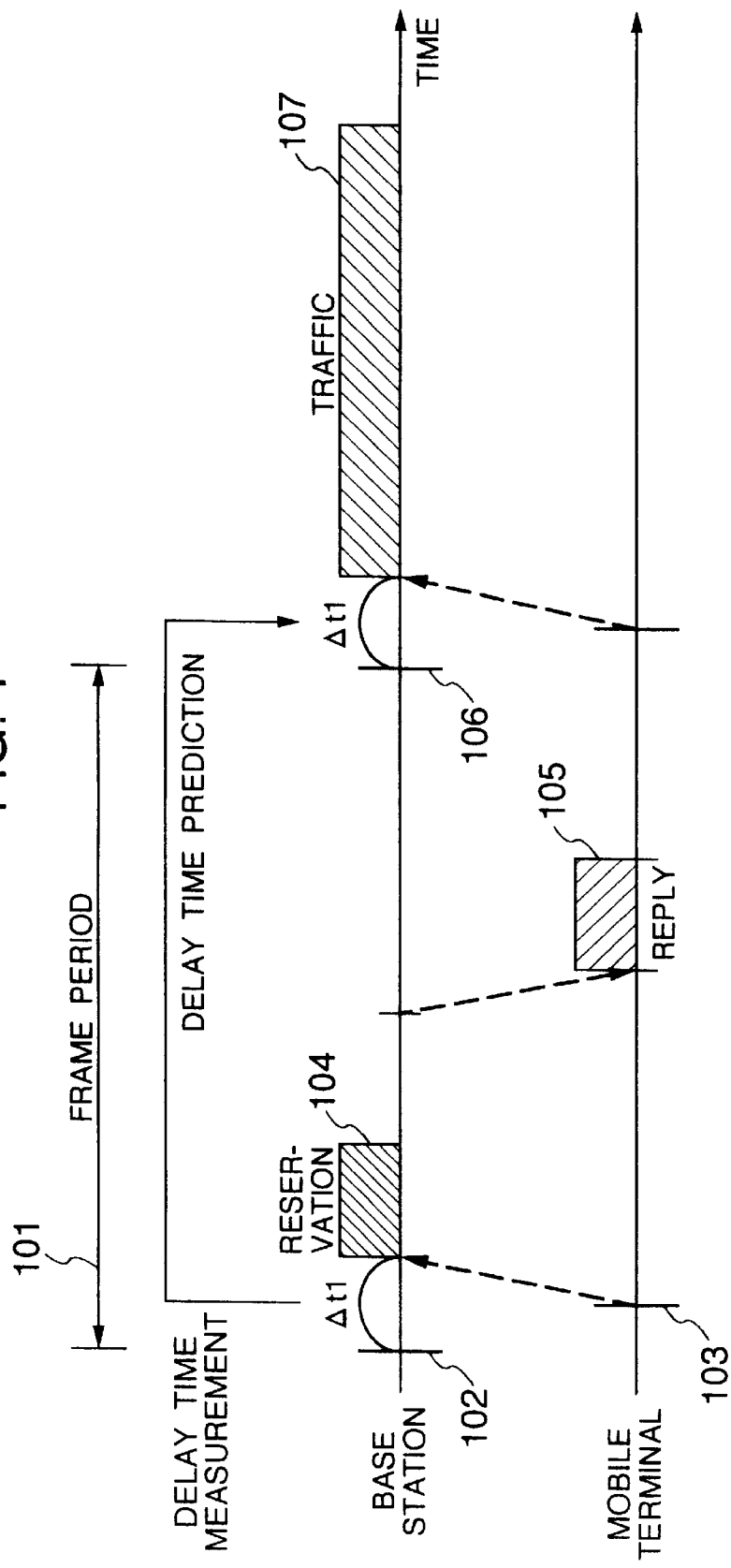
FIG. 1 is a diagram for explaining operation of the first embodiment according to the present invention.

Description will be given of the first embodiment by referring to FIG. 1. FIG. 1 is a diagram for explaining the reception timing of an upward traffic packet. According to the present invention, the packet is transmitted in synchronism with a predetermined point of reference timing. The base station continuously transmits pilot signals spread in spectrum according to a PN sequence having an appropriate period on the downward communication line. Each mobile terminal monitors the pilot signals to extract a synchronizing (reference) signal so as to synchronize with a reply signal and a downward traffic signal from the base station. On the other hand, due to the propagation distance, there appears a difference in time between frame timing 102 of the base station and frame timing 103 of the mobile terminal. Therefore, when the base station receives a reservation packet 104 sent from the mobile terminal, there exists propagation delay time Δt1 associated with the distance.

The base station receives, according to a scheduling algorithm specified by the reply packet 105, an upward or reverse link traffic packet 107 sent from the mobile station. In this operation, according to propagation delay Δt1 measured at reception of the reservation packet 104, the base station starts receiving the traffic packet 107 when Δt1 lapses after a reference point of time 106.

Figure 2:
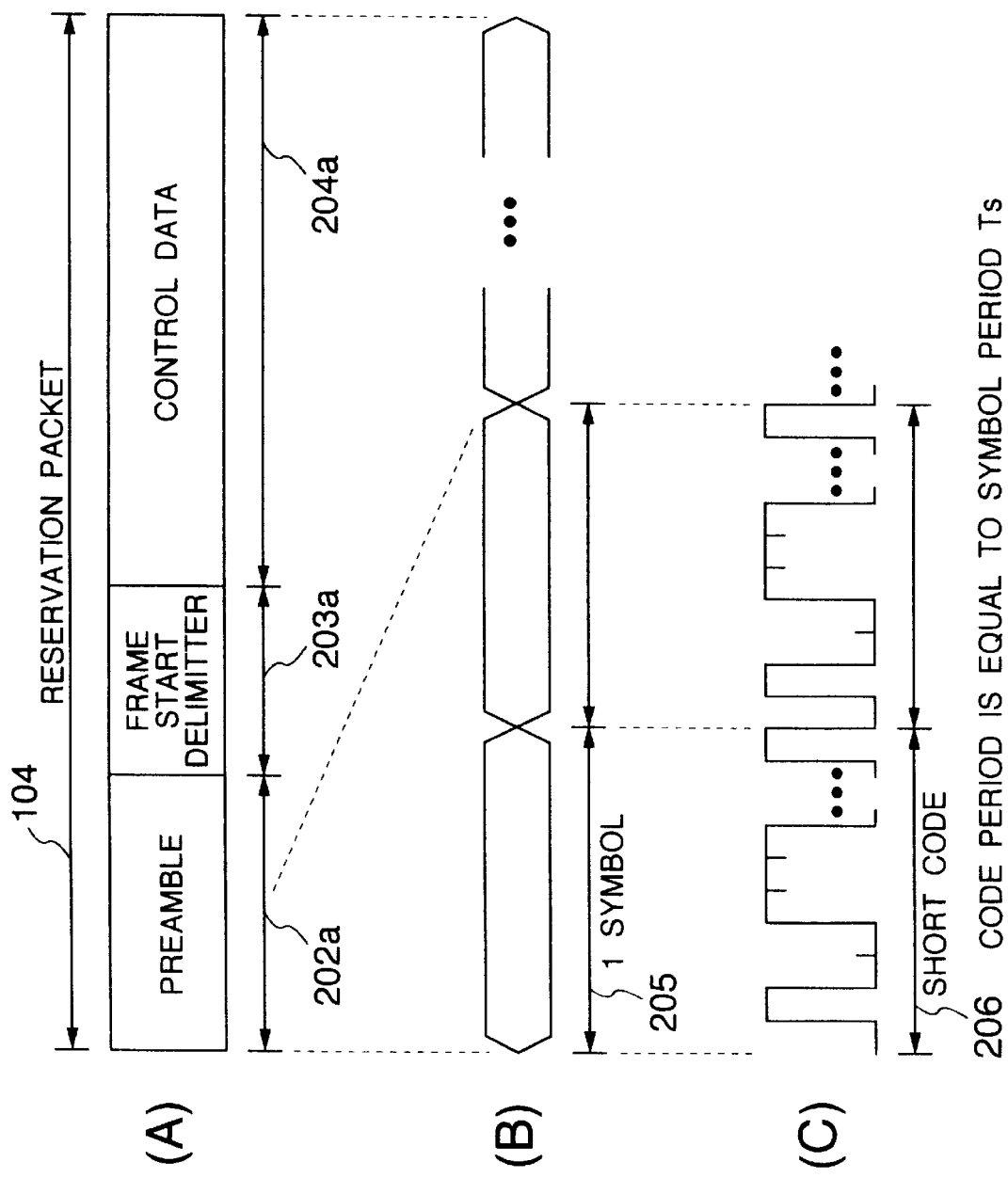
FIG. 2 is a diagram showing the layout of the reservation packet of the present invention.

FIG. 2 shows the layout of the reservation packet and the spreading code allocated thereto. The packet and the code are the same as those of the prior art and hence will not be described.

Figure 3:
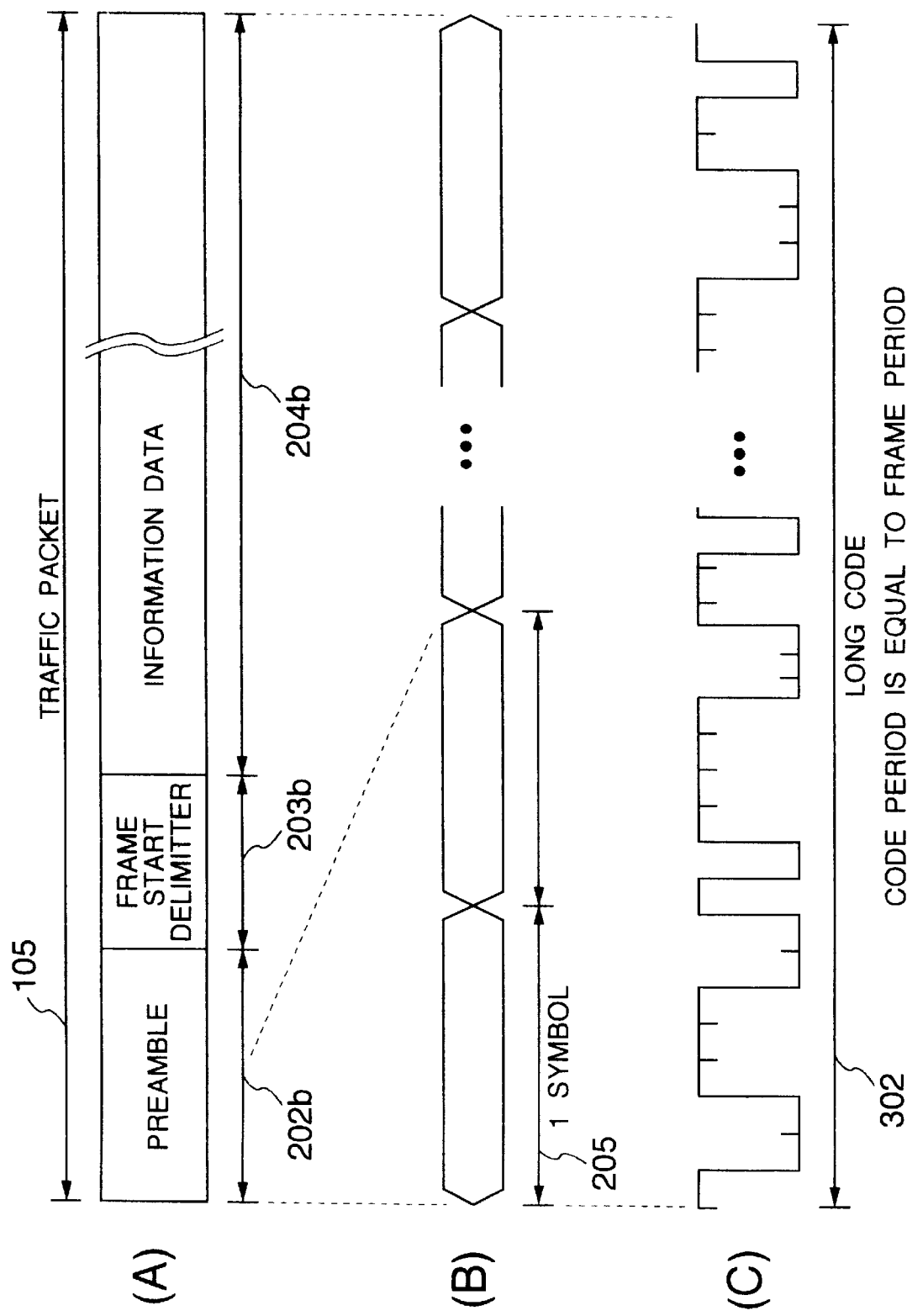
FIG. 3 is a diagram showing the layout of the traffic packet of the present invention.

FIG. 3 shows the layout of the traffic packet and the spreading code allocated thereto. As shown in (A) of FIG. 3, the traffic packet includes a preamble 202b of which each bit is "1", a frame start delimiter 203b to separate the preamble from data, and information data 204b in this order beginning at the first point of the packet. FIG. 3 (C) shows the spreading code allocated to the traffic packet. The period of spreading code thus allocated is equal to that of the traffic packet. In this feature, the traffic packet 105 considerably varies from the reservation packet 104. Namely, looking at one symbol 205 in the traffic packet, it is to be appreciated that the symbol 205 is spread by a spreading code which is different from that used for the other symbols.

Figure 4:
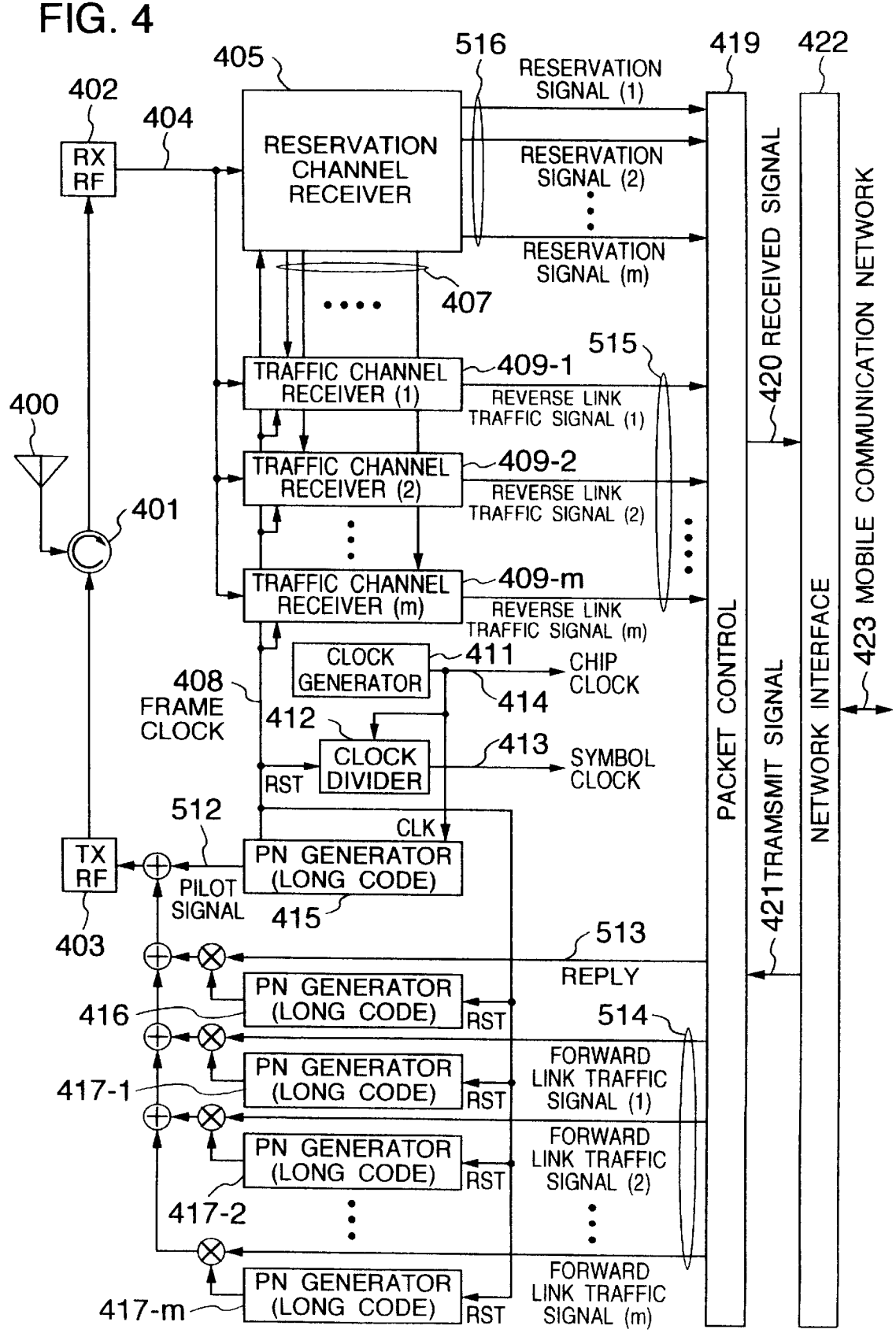
FIG. 4 is a block diagram showing the configuration of a base station in the first embodiment of the CDMA mobile communication system according to the present invention.

FIG. 4 is a diagram showing an example of the configuration of the base station in a CDMA radio communication system to which the present invention is applied. The base station is connected via a network interface 422 to a mobile communication network 423. A packet controller 419 receives a transmission signal 421 from the network interface 422 and then sends a reply signal 513 or a downward (forward link) traffic signal 514 to the pertinent mobile terminal. Moreover, the packet controller 419 receives an upward (reverse link) traffic signal 515 and then sends a received signal 420 to the network interface 422. Additionally, the packet controller 419 obtains a reservation signal 516 on the received reservation channel to schedule data transmission to a terminal having a request for data transmission. The scheduling is accomplished by sending a reply signal to the mobile terminal having transmitted the reservation signal.

A clock generator 411 generates a chip clock signal 414. The chip clock 414 is employed as a clock signal for a PN generator (long code) 415 and the like. A clock divider 412 divides the chip clock 414 generated from the clock generator 411 to produce a symbol clock signal 413. In this connection, to reset the clock divider 412, there is used a frame clock signal 408 generated from the PN generator 415 for the pilot signal, which will be described later.

The base station sends a pilot signal 512, a reply signal 513, and a downward traffic signal 514. These signals are respectively multiplied by spreading codes (long codes) generated respectively from the PN generators 415, 416, and 471-1 to 471-m, the spreading codes being mutually synchronized with each other. The resultant signals are added to each other by adders. The superimposed signal is then transformed into a signal having a carrier frequency by a high-frequency circuit 403 to be transmitted via a circulator 401 from an antenna 400. Moreover, the PN generator 415 for the pilot signal generates a frame clock signal 408 having a period of the long spreading code.

A signal received by the antenna 400 is inputted via the circulator 401 to a high-frequency circuit 402 to be converted into a base-band spread spectrum signal. The base-band signal 404 is supplied to a reservation channel receiver 405 and traffic channel receivers 409-1 to 409-m.

The reservation channel receiver 405 separates a reservation signal from the base-band signal 404 so as to output the reservation signal to the packet controller 419 and a function to output propagation delay information 407 of each reservation packet to the traffic channel receiver 409 corresponding thereto.

The traffic channel receiver 409 receives the propagation delay information 407 from the reservation channel receiver 405 to predict reception timing of a traffic packet to be received. The traffic channel receiver 409 demodulates the base-band signal 404 according to the predicted reception timing to produce an upward traffic signal 515. The signal 515 is then fed to the packet controller 419.

Figure 5:
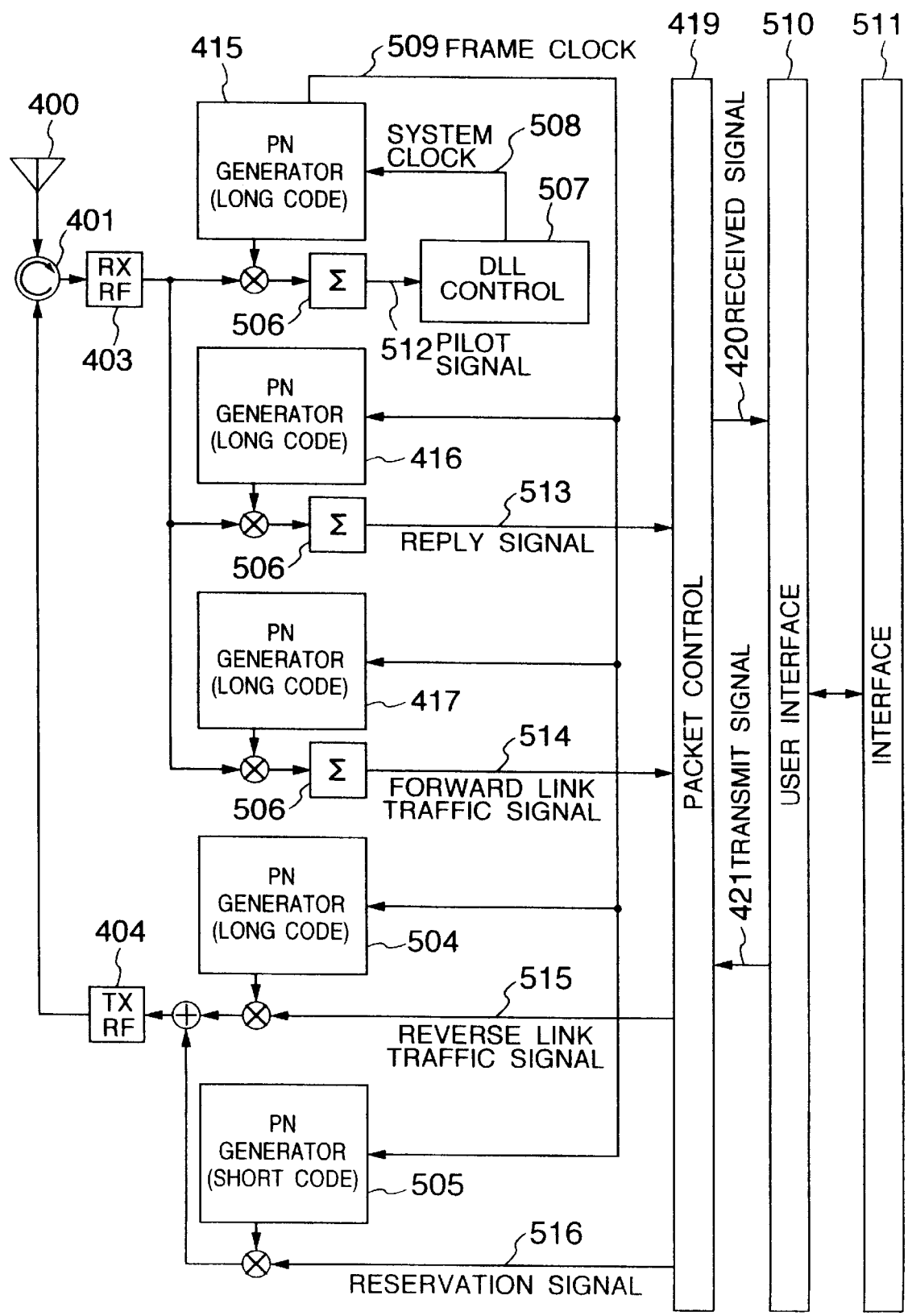
FIG. 5 is a block diagram showing the configuration of a mobile terminal in the first embodiment of the CDMA mobile communication system according to the resent invention.

FIG. 5 shows an example of the configuration of a mobile terminal related to the base state shown in FIG. 4. A signal received by an antenna 400 is inputted via a circulator 401 to a high-frequency circuit 403 to be demodulated into a base-band spread spectrum signal. The signal is multiplied by multipliers by PN (long) codes respectively generated from PN generators 415 to 417 of the respective channels. Namely, a despreading process is conducted for the signal. The signals thus obtained are accumulated for a fixed period of time by an accumulator 506 to be demodulated into received data. A reply signal 513 and a downward traffic signal 514 in the packet format are transformed by a packet controller 419 into original data to be sent as a received signal 420 to a user interface 510. The user interface 510 conducts signal processing for the received signal 420 and then outputs the obtained signal to an input/output interface 511.

Conversely, when a signal is inputted from the interface 511, the user interface 510 accordingly outputs a transmission signal 421 to the packet controller 419. The controller 419 then transmits a reservation signal 516 to the base station to notify the request for transmission. A response from the base station is notified by a reply signal 513.

Reading the reply signal 513, the packet controller 419 transmits, according to a scheduling algorithm indicated by the base station, an upward traffic signal 515 including a packet of the transmission signal 421. The pilot signal 512 is continuously transmitted from the base station. A delay lock loop (DLL) controller 507 keeps synchronization according to the pilot signal. The DLL controller generates a system clock signal 506 to be inputted to the respective PN generators (only the PN generator 415 is shown in FIG. 5). The system clock 506 is equivalent to the chip clock in the base station and is used to establish synchronization between operations respectively of the base station and the mobile terminal. The PN generator (long code) 415 for despreading the pilot signal generates a frame clock signal 509 having a period of the long code. The frame clock 509 is fed to the reset terminal of each PN generator to synchronize PN generators (long code) 416, 417, 504, and 505 with each other. The upward or reverse link traffic signal 515 is multiplied by a multiplier by a spreading code (long code) generated from the PN generator 504, i.e., a spectrum spreading process is carried out for the signal 515. The reservation signal 516 is multiplied by a multiplier by a spreading code (long code) generated from the PN generator 505, i.e., a spectrum spreading process is carried out for the signal 516. The upward traffic signal and the reservation signal having the spreading process are then added by an adder to each other to be transmitted via a high-frequency circuit 404 and a circulator 401 from an antenna 400.

Figure 6:
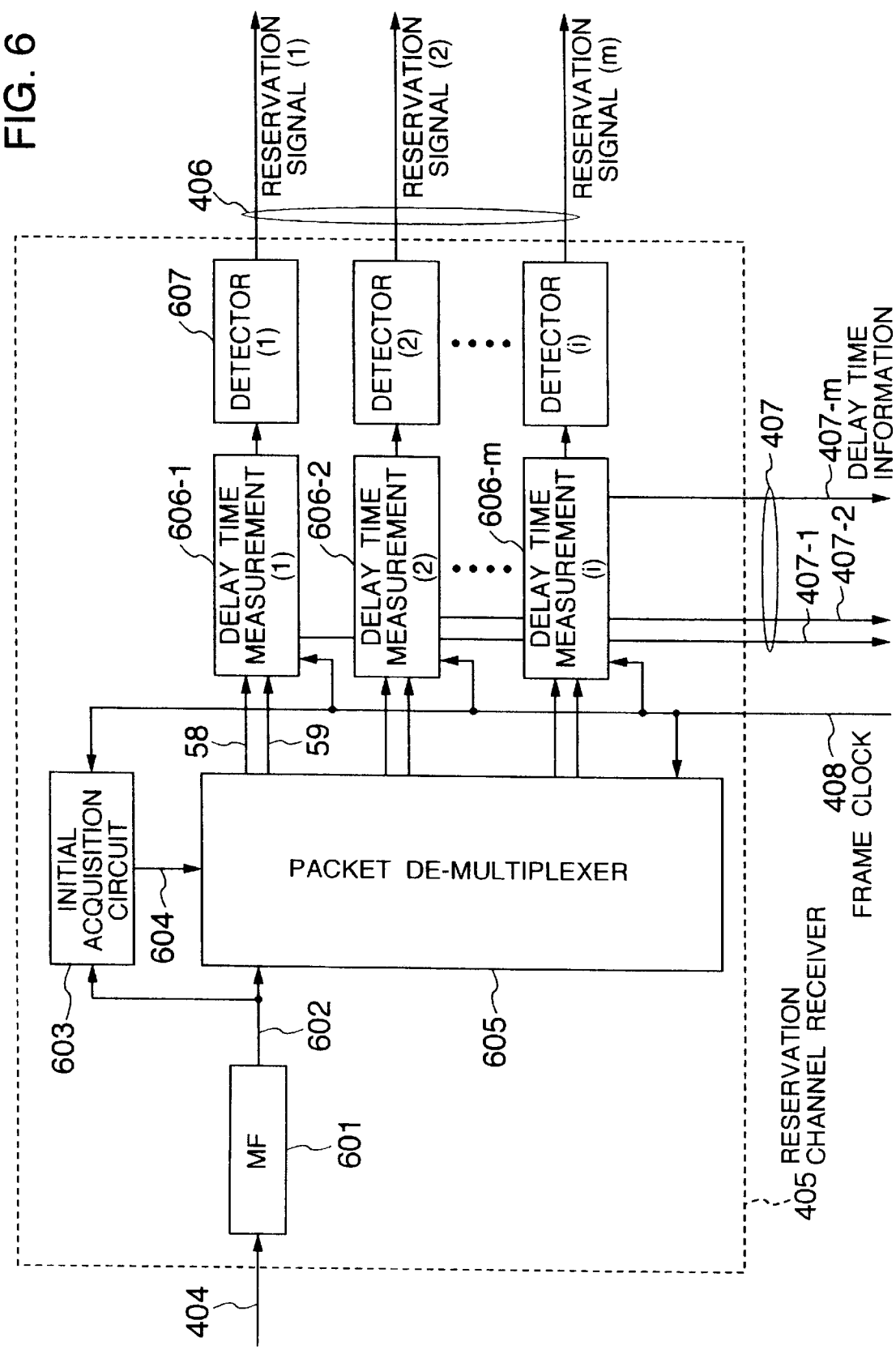
FIG. 6 is a diagram showing the configuration of a reservation channel receiver of the base station.

FIG. 6 shows the configuration of the reservation channel receiver 405. The receiver 405 despreads the base-band signal 404 inputted thereto to produce reservation signals 406-1 to 406-m. Additionally, the receiver 405 measures the values of propagation delay time 407-1 to 407-m of the respectively multiplexed reservation packets.

The base-band signal 404 is transformed by a matched filter 601 into a signal of correlation value 602. The output signal 602 is inputted to an initial acquisition circuit 603 and a packet de-multiplexer 605. The acquisition circuit 603 establishes the chip synchronization in association with the preamble field of the packet to produce a chip synchronization timing signal 604. Using the signal 604, the de-multiplexer 605 de-multiplexes the correlation value signal 602 to separate from each other the packets overlapped in time with each other. The values of chip timing 58-1 to 58-m and received signals 59-1 to 59-m of the separated packets are fed to propagation delay measuring circuits 606-1 to 606-m, respectively. The circuit 606 measures the propagation delay time of each separated packet according to the frame clock 408 to produce information of propagation delay time 407. Detectors 607-1 to 607-m respectively detect the separated packets to thereby demodulate the reservation signals 406.

Figure 7:
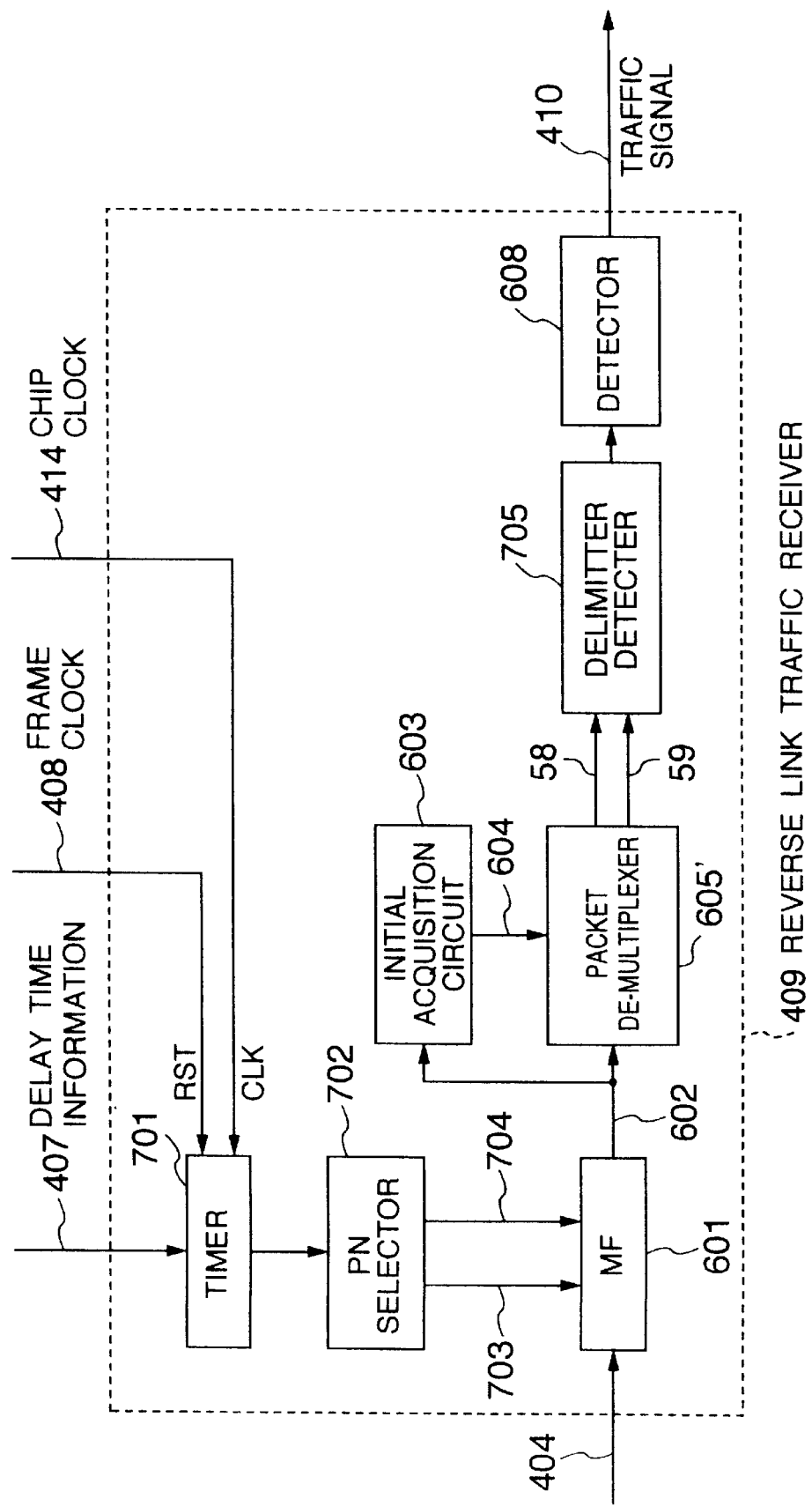
FIG. 7 is a diagram showing the configuration of a traffic channel receiver of the base station.

FIG. 7 shows the configuration of the traffic channel receiver 409. The receiver 409 despreads the inputted base-band signal 404 to produce a traffic signal 410. According to an aspect of the embodiment, the despreading process is conducted according to the information of propagation delay time of the reservation packet transmitted from the same mobile terminal. When reset in response to the frame clock 408, a timer 701 sets the information of propagation delay 407 to its initial value and then receives the chip clock 414 to decrement the value. When a period of time associated with the propagation delay lapses, the timer 701 activates the PN selector 702. While the matched filter of the reservation channel receiver 405 uses the short code PN sequence and hence operates with a fixed coefficient, the matched filter of the traffic channel receiver 409 uses the long code PN sequence and it is therefore required to alter the coefficient thereof for each symbol. The PN selector 702 is provided to vary the coefficient of the matched filter.

The PN selector 702 outputs a PN signal (spread code coefficient) 704 and a matched filter coefficient load signal 703 to the matched filter 601 to set the spread code for the traffic channel to the coefficient of the filter 601 for each symbol period. The initial acquisition circuit 603 of the traffic channel receiver 409 is the same as that of the reservation channel receiver 405. A packet de-multiplexer 605' is responsive to the chip synchronization timing signal 604 generated from the initial acquisition circuit 603 to sample for each symbol period signals outputted from the matched filter and then outputs a chip timing signal 58 and a received signal 59 of the separated packet to a delimiter detector 705. The difference between the packet de-multiplexer 605' and that of the reservation channel receiver 405 resides in that only one of the packets multiplexed with respect to time is separated by the de-multiplexer 605'. The delimiter detector 705 detects a frame start delimiter 203b in the packet configured as shown in FIG. 3 to input only control or information data 204b to a detector 608. The detector 608 detects each separated packet to produce a traffic signal 410.

Figure 8:
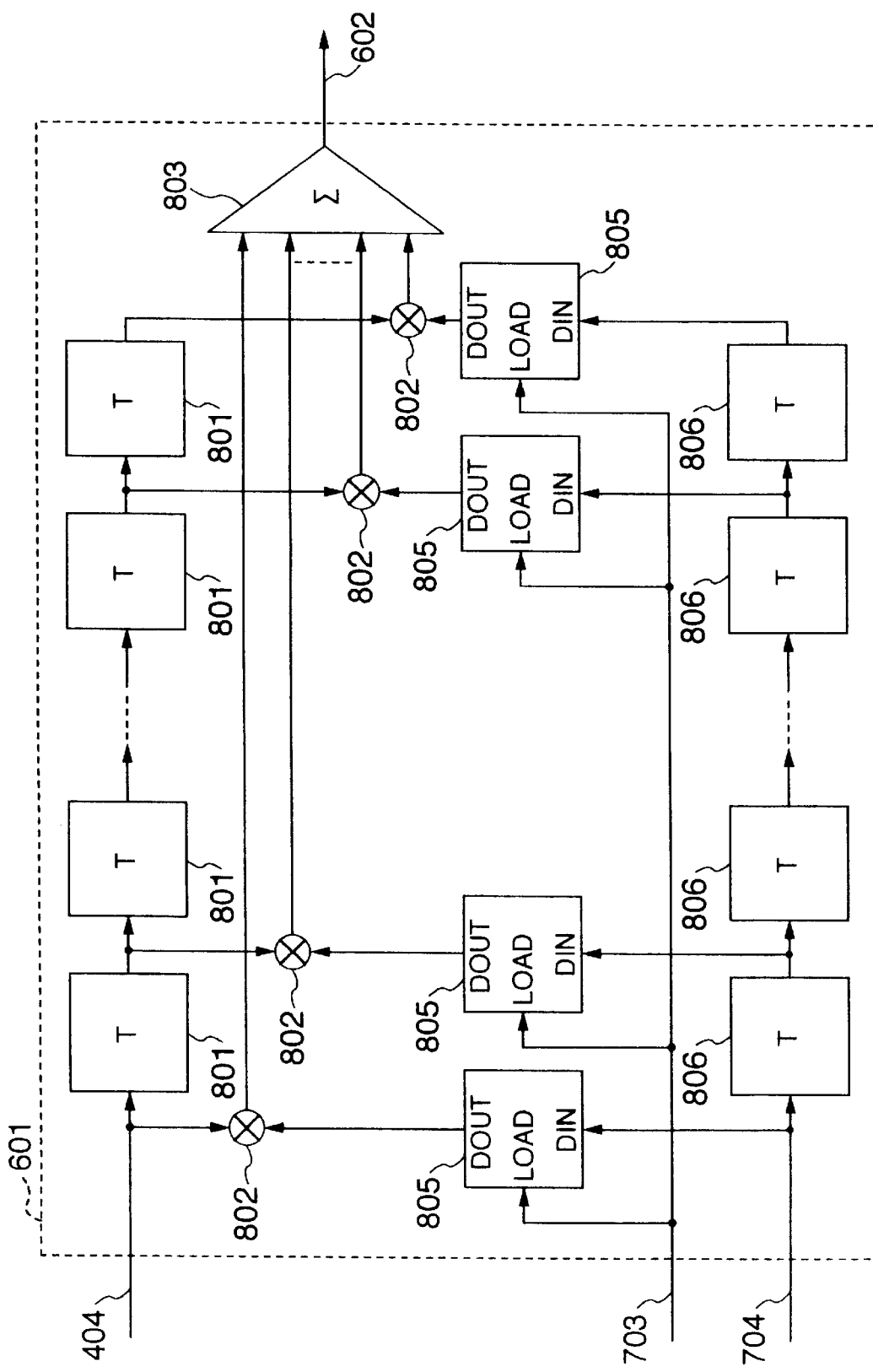
FIG. 8 is a diagram showing the configuration of a matched filter.

FIG. 8 shows the fundamental configuration of the matched filter 601. The filter 601 includes a plurality of cascaded delay elements 801 which each have delay time t equal to the chip duration of PN sequence, a plurality of coefficient registers 805, a plurality of coefficient delay elements 806, and a plurality of coefficient multipliers 802 respectively connected to an input tap of an initial stage and output taps of the respective delay elements. A signal 404 inputted to the filter 601 is propagated sequentially through the delay elements 801. When the signals 404 outputted from the taps match the value set to the coefficient register 805, the outputs from the respective coefficient multipliers 802 have the same sign. Consequently, a correlation value output 602 attained by an adder 803 as the total sum of the outputs from the coefficient multipliers 802 takes a peak value. At any timing other than the timing described above, the outputs resultant from the multiplying operations have mutually different signs and hence the correlation value becomes smaller. To cope with the despreading process of the long code, the matched filter of FIG. 8 has a function to receive the matched filter coefficient load signal 703 and the PN signal 704 from the PN selector 702 shown in FIG. 7 to thereby update the values of the coefficient registers 805. The coefficient delay element 806 reads the PN code from the PN selector 702 in a code-by-code fashion to deliver the code thereto. When the coefficients are completely fed to the delay elements 806, the matched filter coefficient load signal 703 is turned on to load the values of the coefficent delay elements 806 into the related coefficient registers 805.

Figure 9:
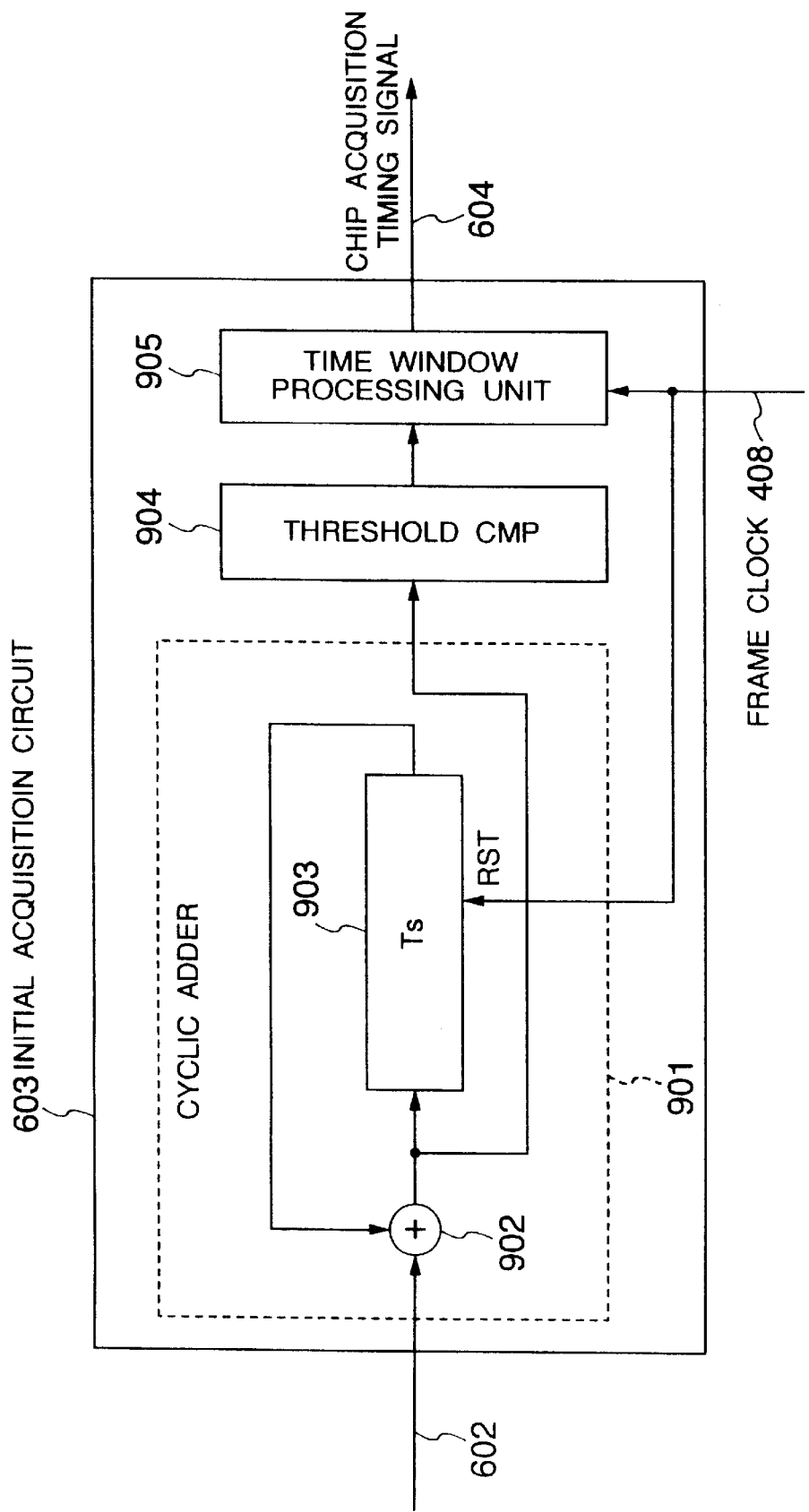
FIG. 9 is a diagram showing the configuration of an initial acquisition circuit in the channel receiver.

FIG. 9 shows the detailed configuration of the initial acquisition circuit 603. The circuit 603 includes a cyclic adder 901, a threshold comparator 904, and a time window processing unit 905. Moreover, the cyclic adder 901 includes an adder 902 and a delay element 903. The element 903 has delay time Ts set to a period of time equal to one symbol. The delay element 903 has a reset terminal to receive the frame clock 408 so as to be cleared for each frame of the packet. The correlation value 602 outputted from the matched filter 601 is added by the adder 902 to the signal advanced one symbol in time and then the result is inputted again to the delay element 903. The correlation value 602 associated with the preamble field of which each bit is "1" is cyclically added as described above. Consequently, the amplitude of correlational peak value outputted from the matched filter 601 for each symbol period is increased as the number of cyclic additions becomes greater. On the other hand, the noise is random and hence is relatively reduced when compared with the peak value. The threshold comparator 904 decides whether or not the output from the adder 902 exceeds the threshold value. Only when the threshold value is exceeded, the threshold comparator 904 is turned on (state of "1"). The time window processing unit 905 validates the output signal from the comparator 904 only during a period of time in which the preamble 202 of the packet can be received according to the frame clock 408 (the predicted propagation delay time and the reception period of preamble field) to output the signal as a chip synchronization timing signal 604 therefrom.

Figure 10:
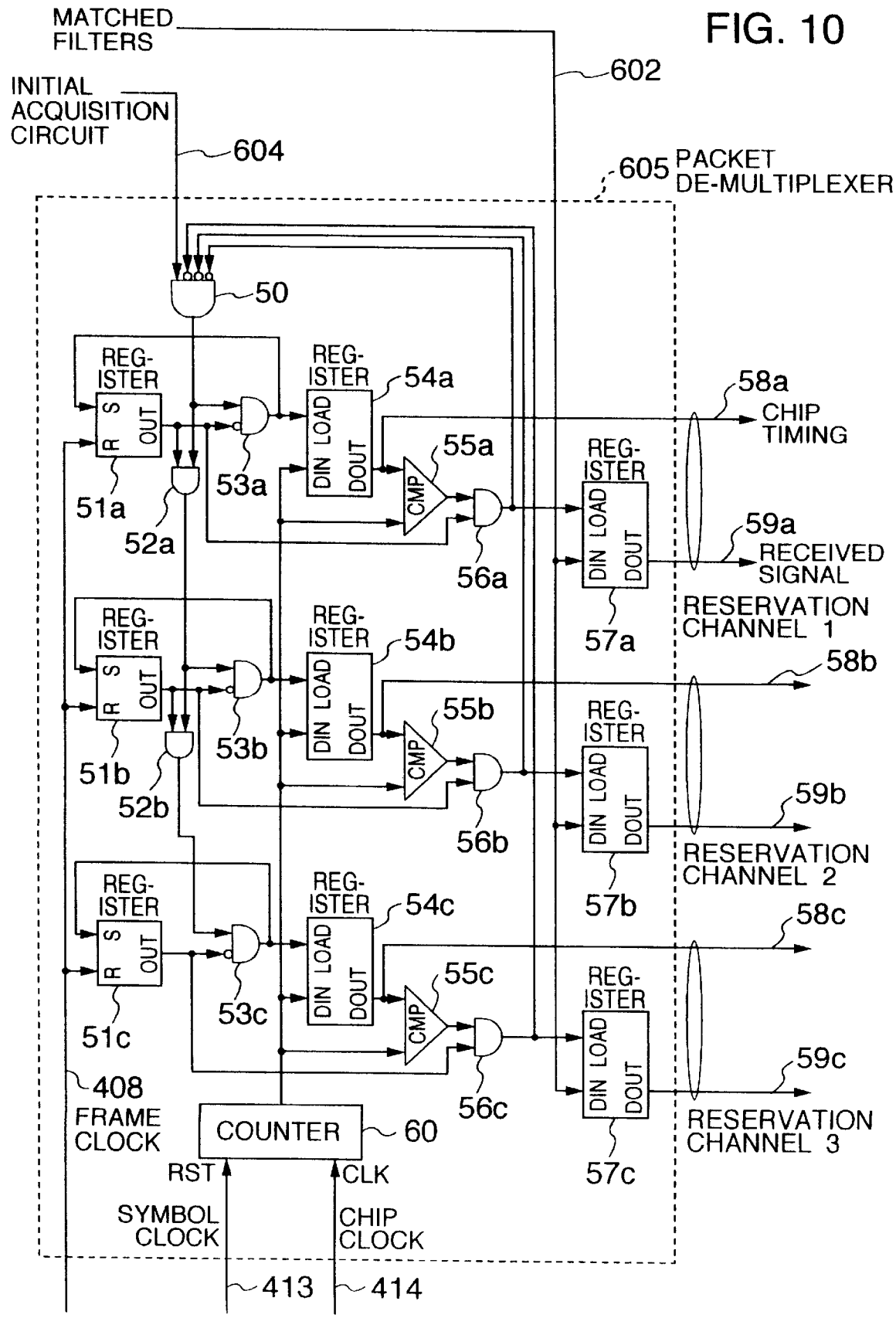
FIG. 10 is a diagram showing the configuration of a packet de-multiplexer in the channel receiver.

FIG. 10 shows an example of the construction of the packet de-multiplexer 605. The chip synchronization timing signal 604 attained from the initial acquisition circuit 603 is inputted to an AND gate 50. The AND gate 50 has another input terminal which is off in the initial state. Due to the inverted or negation signals inputted thereto, the AND gate 50 is opened by the signal outputted from the comparator to set the output signal from the gate 50 to the on state ("1"). The on signal from the AND gate 50 is then fed to AND gates 52a and 53a.

The AND gate 53a includes another input receiving an inverted signal of an output signal from a register 51a. In the initial state, the output from the register 51a is off ("0"). Therefore, when the output from the AND gate 50 is set to the on state, the output from the AND gate 53a is also set to the on state. The on state ("1") of the AND circuit 53a is inputted as an enable signal to a timing generator 54a. The value of a counter 60 at this moment is set to a timing register 54a as a value to indicate the acquisition timing. The counter 60 conducts the counting operation with the chip period of the PN code. In the counting operation, when the reset input of the symbol clock 41 is received, the counter 60 is restored to the initial value according to the symbol period to conduct the counting operation.

Additionally, the on signal from the AND gate 53a sets a register 51a to the on state, the register 51a controlling other inputs of the AND gates 52a and 53a. The register 51a keeps the on state until the register 51a is reset by the frame clock 408 at the initial point of the next frame. During the period (from when the AND gate 53a is set to the on state to when the initial point of the next frame is recognized), the register 51a keeps the AND gate 53 in the closed state to prevent another value from being set to the timing register 54a.

The acquisition timing value set to the timing register 54a is compared by a comparator 55a with the signal outputted from the counter 60. Each time the value of counter 60 is equal to the value (acquisition timing) set to the timing register 54a, the comparator 55a is set to the on state. The on-state signal outputted from the comparator 55a is inputted to an enable terminal of a data register 57a via an AND gate 56a which is in the open state when the register 51a is on. As a result, the signal outputted from the matched filter at the acquisition timing is inputted to the data register 57a and is then outputted therefrom as a received signal 59a.

Description will now be given of a case in which the matched filter outputs the next peak value when the register 51a is on. In this situation, the chip synchronization signal 604 from the acquisition circuit as well as inverted signals of output signals from AND gates 56a, 56b, and 56c are being supplied to the AND gate 50. As described above, the AND gate 56a produces an on-state output signal when the value of counter 60 is equal to the value set to the timing register 54a. Therefore, the AND gate 50 is kept closed at the acquisition timing set to the timing register 54a. In this state, the AND gate 50 is opened when a peak value input is received from the matched filter at a timing other than the acquisition timing above.

The on signal from the AND gate 50 is sent via the AND gate set to the open state by the output from the register 51a and the AND gate 53b set to the open state by the output from the register 51b to an enable terminal of a timing register 54b in the subsequent stage. Resultantly, the value outputted from the counter 60 is set to the timing register 54b. At this time, the register 51b is set to the on state and prevents, through an operation similar to that of the register 51a in the preceding stage, another value from being set to the register 54b until the frame is terminated.

The timing registers 54a to 54c of the respective stages operate in a mutually similar manner such that the output signal from the matched filter corresponding to each reservation packet is kept in the associated data register 57a, 57b, or 57c for each symbol. The signals are then outputted therefrom as received signals 59a to 59c, respectively. The example of FIG. 10 includes the timing registers 54a to 54c in the three-stage structure. Consequently, three acquisition timing values can be memorized for three leading packets selected in the generation order from a plural packets generated in an overlapped manner with respect to time.

Figure 11:
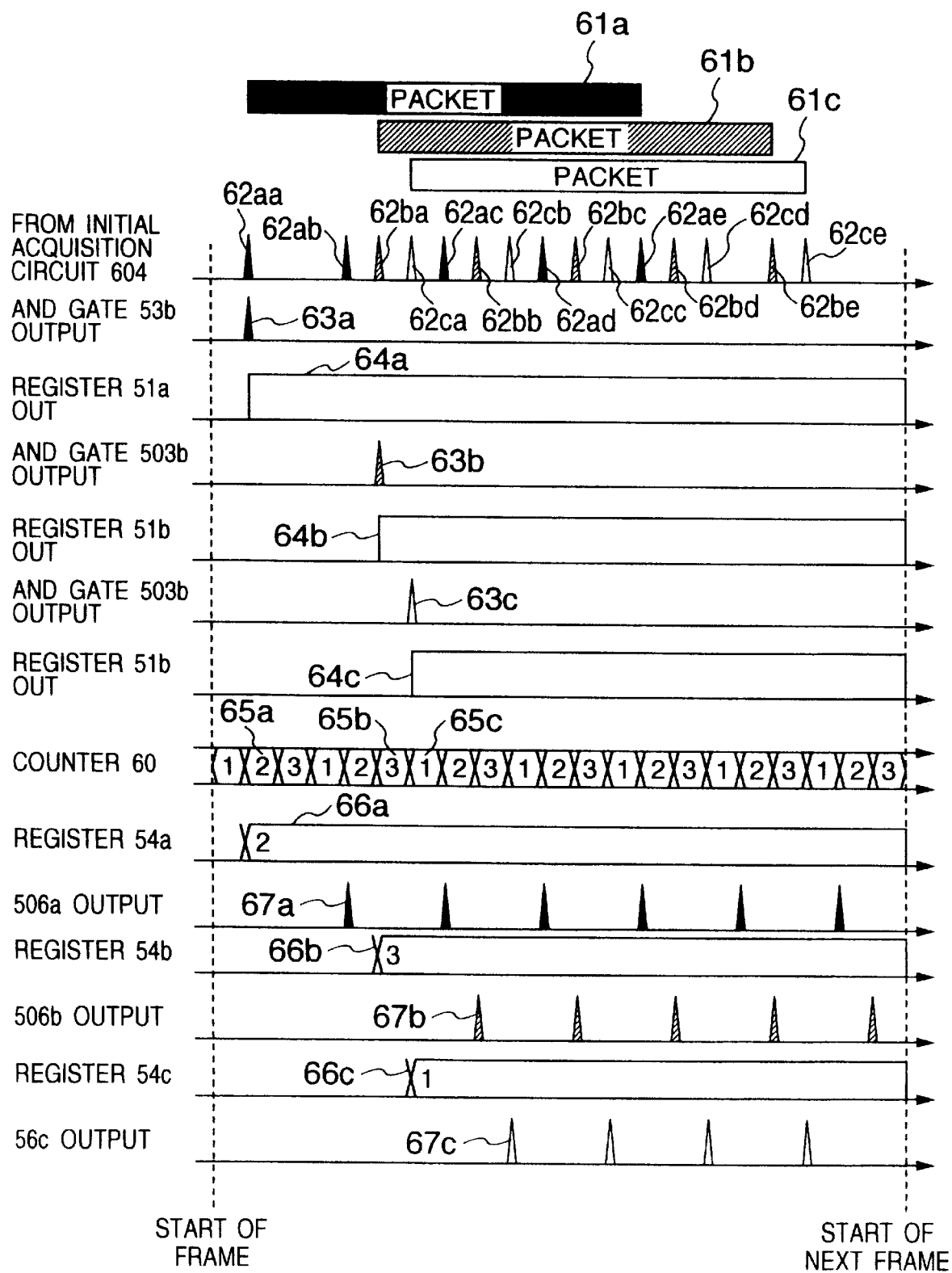
FIG. 11 is a schematic diagram showing operation of the packet de-multiplexer.

FIG. 11 shows in a schematic diagram a specific example of the de-multiplexing operation. In this example, three packets for which the spreading process is conducted with a process gain set to 3 and of which the packet length is five symbols are de-multiplexed by the circuit configuration shown in FIG. 10. The outputs of chip synchronization timing signal 604 from the initial acquisition circuit 603 are denoted as 62aa to 62ae (packet 61a), 62ba to 62be (packet 61b), and 62ca to 62ce (packet 61c). The outputs from the AND gates 53a to 53c are indicated as 63a to 63c, respectively. The outputs from the registers 51a to 51c are respectively represented as 64a to 64c. The outputs from the timing registers 54a to 54c are denoted as 66a to 66c, respectively. The outputs from the AND gates 56a to 56c are respectively indicated as 67a to 67c.

When the output signal 63a is received from the AND gate 53a, the timing register 54a is loaded with the value "2" (65a) from the counter 60. Thereafter, the AND gate 56a produces an on-state signal at a timing when the output value 66a from the timing register 54a is equal to that from the counter 60 (67a).

Similarly, in response to the output values 63b and 63c respectively from the AND gates 53b and 53c, the timing registers 54b and 54c are respectively loaded with the values "3" (65b) and "1" (65c) from the counter 60. Thereafter, the AND gates 56b and 56c produce on-state signals as the outputs 67b and 67c at timing when the output values 66b and 66c from the timing registers 56b and 56c each become equal to that from the counter 60 (67b, 67c).

Figure 12:
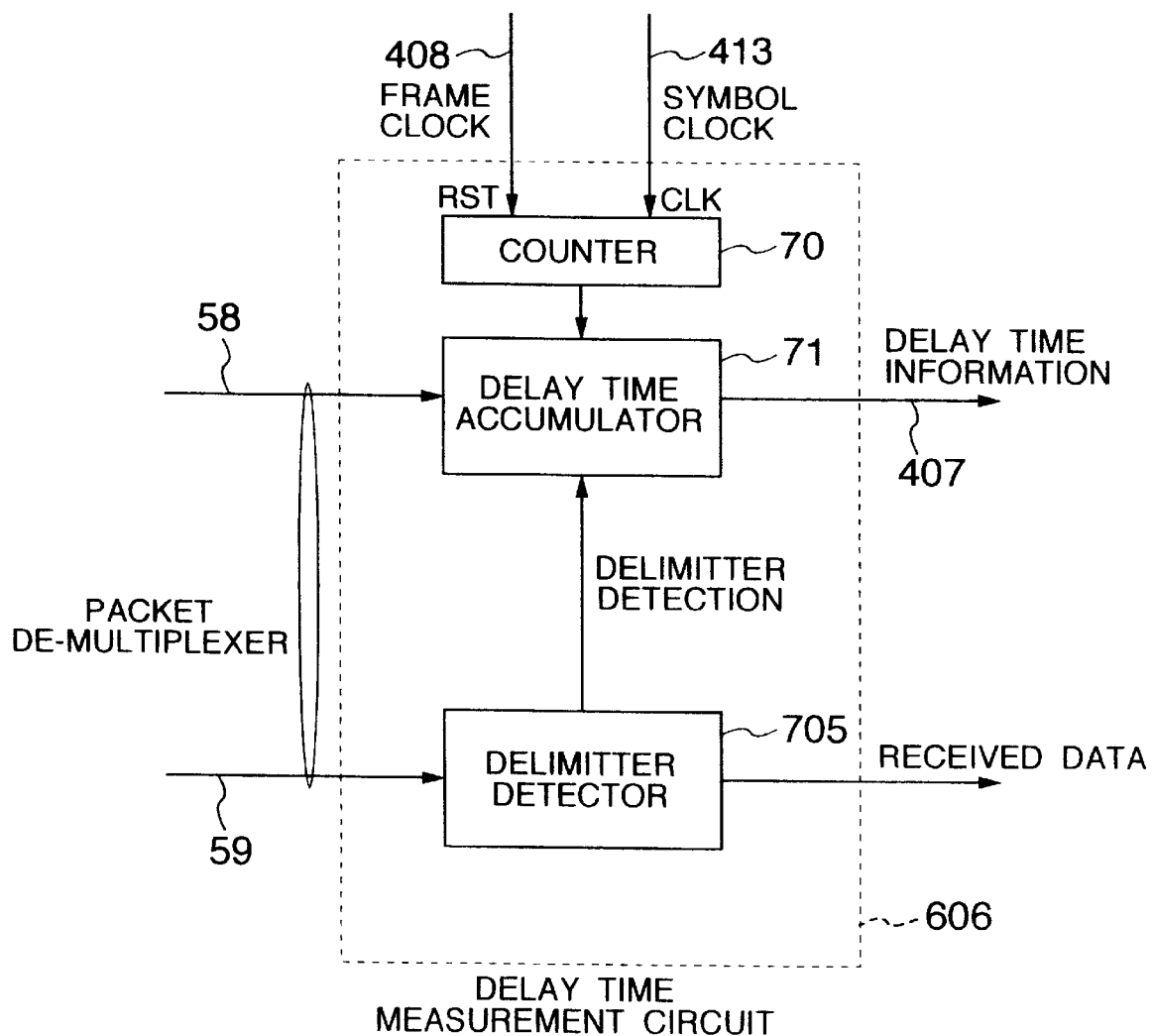
FIG. 12 is a diagram showing the configuration of a propagation delay measuring circuit in the reservation channel receiver.

FIG. 12 shows the configuration of the propagation delay measuring circuit 606. A delimiter detector 705 detects the frame start delimiter 203 in the packet configured as shown in FIGS. 2 and 3 to output only the information data 204 as received data. At the same time, the circuit 705 notifies a propagation delay accumulator 71 with the timing of detection of the delimiter 203. The accumulator 71 measures the propagation delay time in the one-symbol unit or for each symbol. A symbol counter 70 is a counter which is reset at the first point of each frame and which conducts the counting operation in the symbol unit. The accumulator 71 obtains the delay of the packet for each symbol according to the value of the symbol counter 70. The point of time when the delimiter is detected is used as a reference point of the operation. The propagation delay time of the packet detected for each symbol by the propagation delay accumulator 71 is added to the propagation delay time of the packet attained in the chip unit or for each chip by the packet de-multiplexer 605 (i.e., the output from the timing register 54 of FIG. 10). The period of time required for the processing in the receiver is then subtracted from the result of the addition to thereby produce the delay time information 407 of the traffic packet.

Figure 13:
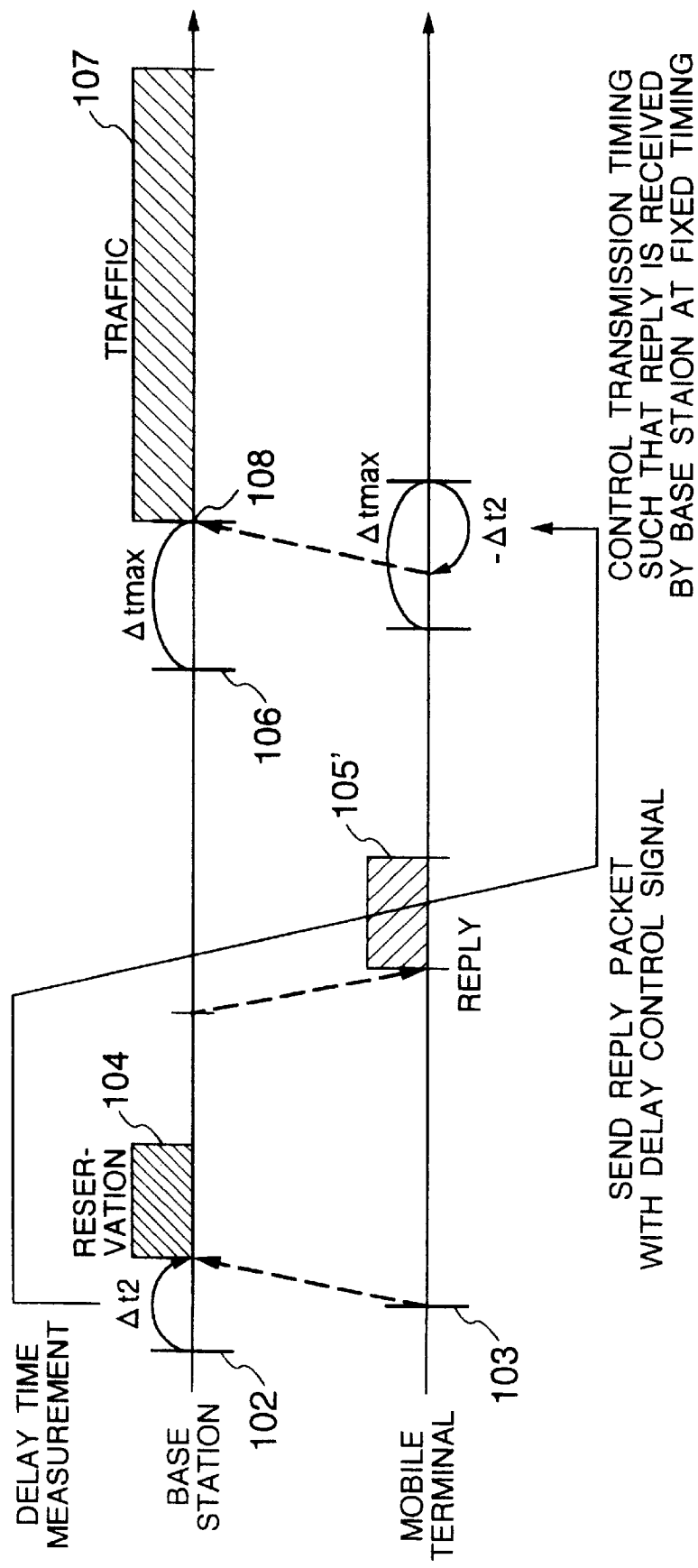
FIG. 13 is a diagram for explaining operation of the second embodiment according to the present invention.
Figure 14:
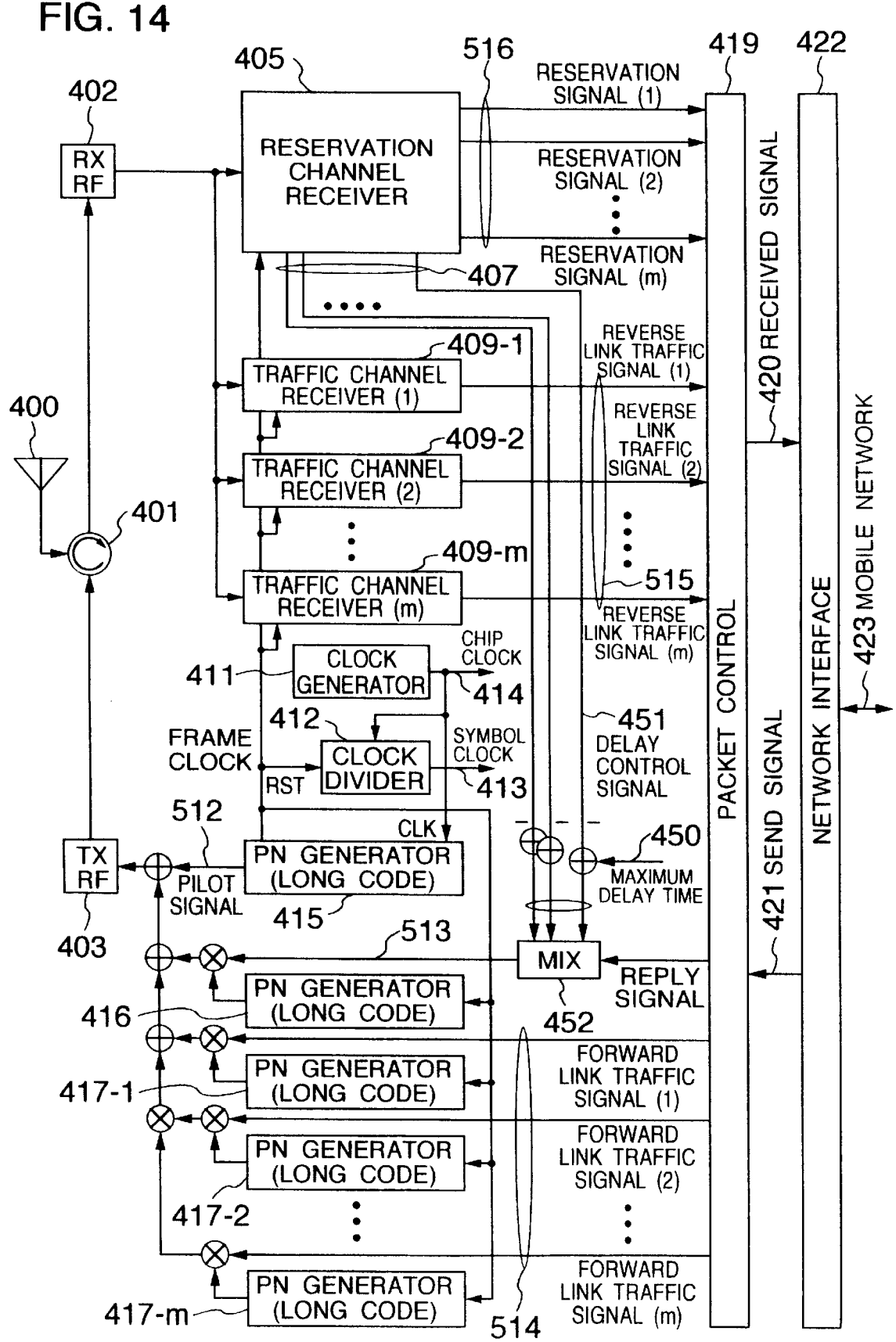
FIG. 14 is a block diagram showing the configuration of a base station in the second embodiment of the CDMA mobile communication system according to the present invention.
Figure 15:
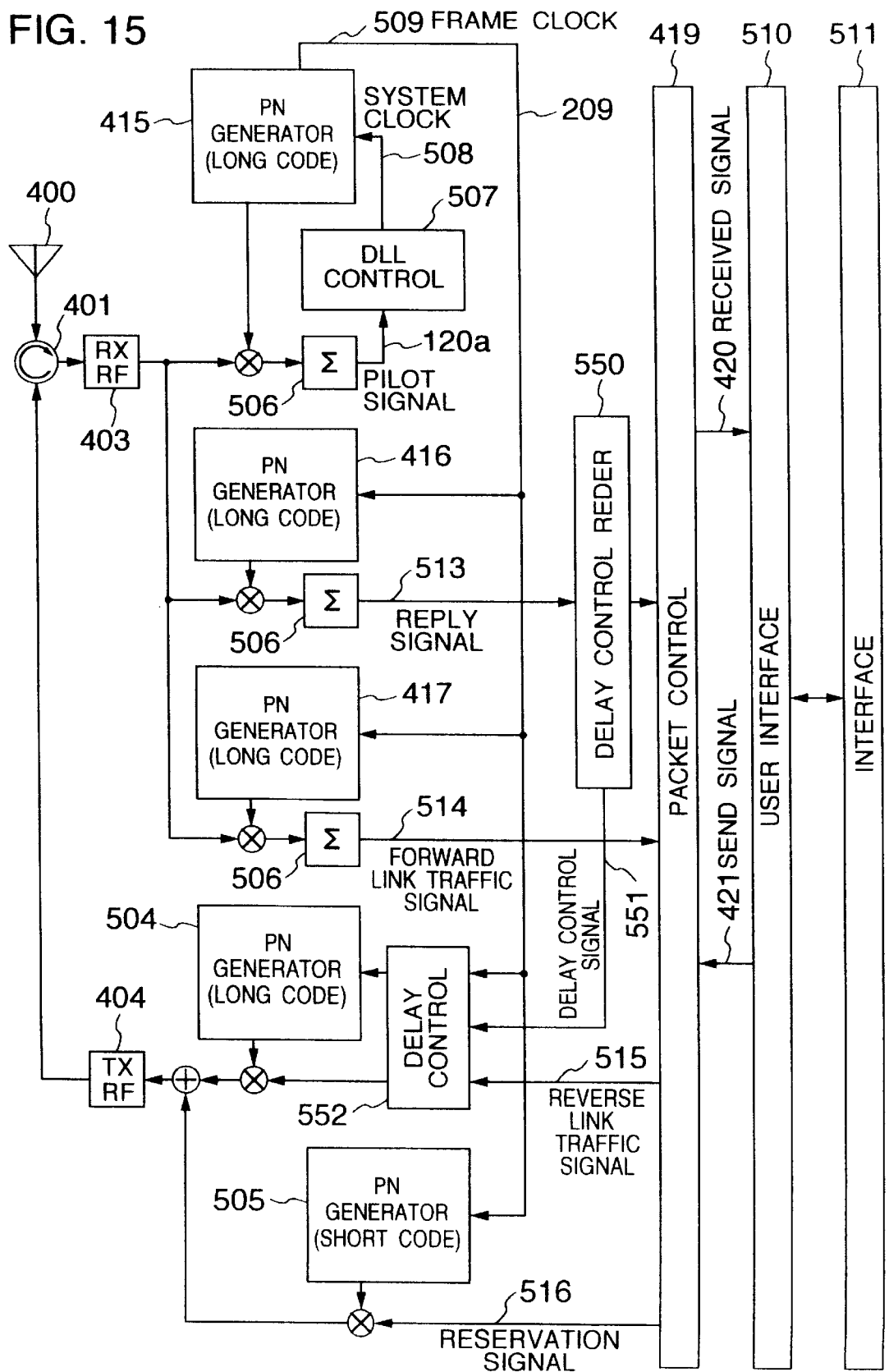
FIG. 15 is a block diagram showing the configuration of a mobile terminal in the second embodiment of the CDMA mobile communication system according to the present invention.

FIGS. 13 to 15 shows the second embodiment according to the present invention. FIG. 13 is a diagram for explaining the reception timing of the upward or reverse link traffic packet in the second embodiment. In this embodiment, the base station starts the despreading process at a point of timing when a predetermined maximum delay $\alpha$tmax lapses after the reference point of timing. At reception of a reservation packet, the base station measures delay time $\Delta$t2 and subtracts the delay time from the maximum delay time $\Delta$tmax to produce a delay control signal representing the resultant value, i.e., $\Delta$tmax–$\Delta$t2. The control signal is notified to the mobile terminal by the reply packet 105'. The mobile terminal decodes the delay control signal in the reply packet to transmit an upward traffic packet when the time ($\Delta$tmax–$\Delta$t2) indicated by the delay control signal lapses after the reference point of timing. Thanks to the correction of delay by the mobile terminal, the base station can initiates receiving the upward traffic packet 107 at timing delayed $\Delta$tmax relative to the reference timing.

FIG. 14 shows the configuration of the base station in the second embodiment. In the embodiment, the delay time information 407 measured according to the reservation packet is passed to the mobile terminal by the reply signal 513. On the basis of the delay time information 407, the mobile terminal corrects the propagation delay to send data with the corrected delay via the upward traffic channel. In FIG. 14, the same circuit constituent elements as those of FIG. 4 are assigned with the same reference numerals and achieve the same functions as those of FIG. 4.

In the second embodiment, the delay time information 407 measured by the reservation channel receiver 405 is subtracted from the maximum delay time 450 to attain the delay control signal 451. The signal 451 is mixed with a reply signal 513 by a mixer 452 to be transmitted to the mobile terminal. When the upward traffic packet sent from the mobile terminal with a delay time corresponding to the delay control signal 451 is received by the base station, the propagation delay of the packet is virtually equal to the maximum delay time 450. After a lapse of the maximum delay time 450, a PN selector 702 of each of the traffic channel receivers 409-1 to 409-m initiates its operation.

FIG. 15 shows the construction of the mobile terminal in the second embodiment. The same circuit constituent elements of FIG. 15 as those of FIG. 5 are assigned with the same reference numerals and achieve the same functions as those of FIG. 5. A delay control signal decoder 550 obtains a delay control signal from the reply signal 513 to output the control signal to a delay controller 552. The delay controller 552 delays the data for a period of time relative to the reference timing indicated by a frame clock 509, the period of time being indicated by the delay control signal 551.

Figure 16:
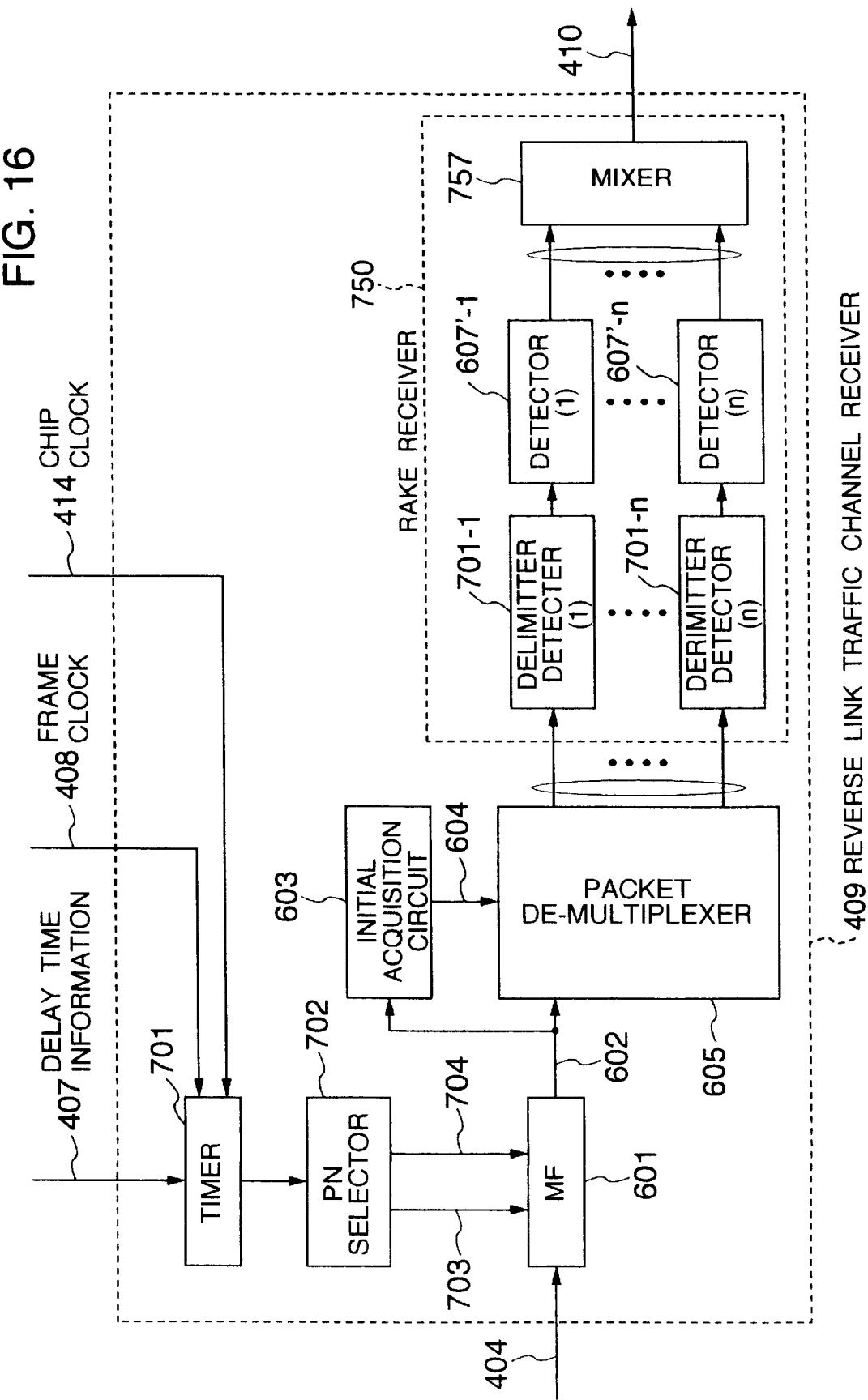
FIG. 16 is a block diagram showing another configuration of a traffic channel receiver in the base station of the CDMA mobile communication system according to the present invention.
Figure 17:
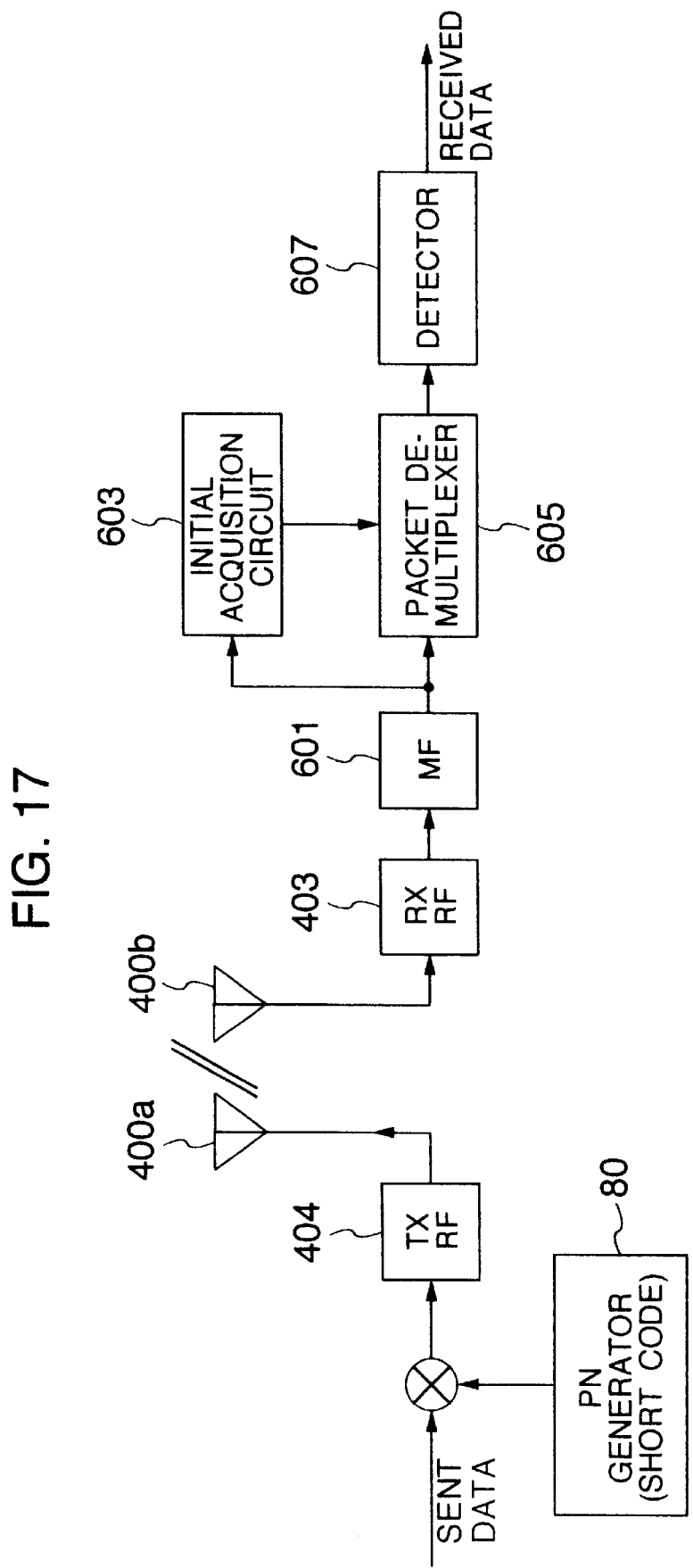
FIG. 17 is a diagram showing the configuration of a transmitter-receiver in conventional technology.

FIG. 16 shows another example of the configuration of the reservation traffic channel receiver 409. Applied to a reverse link traffic receiver 409 shown in FIG. 16 is the RAKE reception. Also in FIG. 16, the same circuit constituent elements as those of FIG. 7 are assigned with the same reference numerals and achieve the same functions as those of FIG. 7. According to this configuration example, as in the reservation channel receiver 405, packets overlapped in time with each other are de-multiplexed or separated from each other by a packet de-multiplexer 605 in the traffic channel receiver 409. The de-multiplexed signals from the de-multiplexer 605 are mixed with each other by a RAKE receiver 750.

The receiver 750 includes a plurality of delimiter detectors 701-1 to 701-$n$ and detectors 607'-1 to 607'-$n$. Signal of each separated packet from the de-multiplexer 605 are detected to be mixed with each other by a mixer 757.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. A spread spectrum communication system, in which spread spectrum communication is conducted between a master station and a subordinate station, wherein:

the subordinate station establishes a frame synchronization according to a downward reference signal transmitted from the master station and sends an upward control signal according to the frame synchronization, the master station derives a propagation delay time on a radio channel from a relationship between a downward control signal and the upward control signal, the subordinate station transmits an upward data signal in synchronism with a frame synchronizing signal, and the master station receives the upward data signal at timing in accordance with the propagation delay time; said spread spectrum communication system comprising:

a downward pilot channel for transmitting a reference signal in a downward direction from the master station to the subordinate station;

an upward control channel which is spread by a spreading code having a repetition period substantially equal to one-symbol time for transmitting data in an upward direction from the subordinate station to the master station; and an upward traffic channel which is spread by a spreading code having a repetition period longer than the one-symbol time;

wherein the master station comprises:

a first matched filter for receiving the upward control channel, a second matched filter for receiving the upward traffic channel having a configuration for changing a coefficient thereof for each symbol, a mechanism which measures a propagation delay by comparing timing of a signal demodulated by the first matched filter with reference timing used in the master station, and a mechanism which controls timing of changing a coefficient of the second matched filter according to a result of measurement of the propagation delay; and the subordinate station comprises:

a mechanism which extracts the reference timing of the master station by receiving the reference signal via the downward pilot channel, and a mechanism which transmits an upward data signal to the upward traffic channel in synchronism with the reference timing extracted from the downward control signal.

2. A spread spectrum communication system according to claim 1, further comprising:

a data structure in the data transmitted from the subordinate station to the upward channel, the data structure including a fixed data pattern in a first field of the data; and a cyclic adder in the master station for cyclically adding to each other the output from the second matched filter, wherein the synchronization is established, according to an output from the cyclic adder, in the first field of the data sent from the subordinate station to a second channel.

3. A spread spectrum communication system according to claim 1, further comprising:

means for separating in the master station a plurality of peaks from the output from the second matched filter, wherein signals which are sent from the subordinate station to the second channel and which are received via mutually different traffic paths with a time difference therebetween are separated from each other and are demodulated to be then mixed with each other.

4. A spread spectrum communication system in which a spread spectrum communication is conducted between a master station and a subordinate station, wherein:

the subordinate station establishes a frame synchronization according to an upward reference signal transmitted from the master station, sends an upward control signal according to the frame synchronization, and derives a propagation delay time on a radio channel from a relationship between a downward control signal and the upward control signal, the master station notifies information of the propagation delay time via a downward channel to the subordinate station, the subordinate station transmits an upward data signal at timing in accordance with the propagation delay time, and the master station receives the upward data signal;

said spread spectrum communication system comprising:

a downward pilot channel for transmitting a reference signal in a direction from the master station to the subordinate station;

a downward control channel for transmitting a signal in a direction from the master station to the subordinate station;

an upward control channel which is spread by a spreading code having a repetition period substantially equal to one-symbol time for transmitting data in a direction from the subordinate station to the master station; and an upward traffic channel which is spread by a spreading code having a repetition period longer than the one-symbol time;

wherein the master station comprises:

a first matched filter for receiving the upward control channel, a second matched filter for receiving the upward traffic channel having a configuration for changing a coefficient thereof for each symbol, a mechanism which measures a propagation delay by comparing timing of a signal demodulated by the first matched filter with reference timing used in the master station, and a mechanism which transmits information of the propagation delay to the downward control channel; and the subordinate station comprises:

a mechanism which extracts the reference timing of the master station by receiving the downward pilot channel, a mechanism which receives the downward control signal and extracting the propagation delay measured by the master station, and a mechanism which transmits upward data to the upward traffic channel at timing in correspondence with the propagation delay extracted from the downward control signal.

5. A spread spectrum communication system according to claim 4, further comprising:

a data structure in the data transmitted from the subordinate station to the upward channel, the data structure including a fixed data pattern in a first field of the data; and a cyclic adder in the master station for cyclically adding to each other the output from the second matched filter, wherein the synchronization is established, according to an output from the cyclic adder, in the first field of the data transmitted from the subordinate station to a second channel.

6. A spread spectrum communication system according to claim 4, further comprising:

means for separating in the master station a plurality of peaks from the output from the second matched filter, wherein signals which are sent from the subordinate station to the second channel and which are received via mutually different traffic paths with a time difference therebetween are separated from each other and are demodulated to be then mixed with each other.

* * * * *